United States Patent [19]

Bentley

[11] Patent Number: 4,996,461
[45] Date of Patent: Feb. 26, 1991

[54] CLOSED LOOP BUCKING FIELD SYSTEM

[75] Inventor: Robert Bentley, Hacienda Heights, Calif.

[73] Assignee: Hughes Aircraft Company, Los Angeles, Calif.

[21] Appl. No.: 404,147

[22] Filed: Sep. 7, 1989

[51] Int. Cl.$^5$ .............................................. H01J 29/06
[52] U.S. Cl. ...................................... 315/8; 315/85; 315/370; 313/430
[58] Field of Search ...................... 315/8, 85; 361/267; 313/430

[56] References Cited

U.S. PATENT DOCUMENTS

| | | | |
|---|---|---|---|
| 3,757,154 | 9/1973 | Okita et al. | 315/8 |
| 3,867,668 | 2/1975 | Shrader | 315/85 |
| 4,380,716 | 4/1983 | Romeo et al. | 315/8 |
| 4,556,821 | 12/1985 | Cooper | 315/8 |
| 4,560,900 | 12/1985 | Ikegaki et al. | 315/85 |
| 4,851,737 | 7/1989 | Johansson et al. | 315/8 |
| 4,864,192 | 9/1989 | Buchwald et al. | 315/8 |
| 4,899,082 | 2/1990 | Sands et al. | 315/8 |
| 4,922,153 | 5/1990 | Kevius | 315/85 |

FOREIGN PATENT DOCUMENTS

| | | | |
|---|---|---|---|
| 2555385 | 5/1985 | France | 315/8 |
| 0047321 | 4/1977 | Japan | 315/8 |
| 0104187 | 8/1980 | Japan | 315/8 |

Primary Examiner—Eugene R. LaRoche
Assistant Examiner—Son Dinh
Attorney, Agent, or Firm—Wanda K. Denson-Low

[57] ABSTRACT

A system for improving the operation of a cathode ray tube (CRT) is disclosed whereby interference caused by external magnetic fields is mitigated. The system comprises a CRT having a CRT magnetic shield housing and at least one electromagnetic field sensor disposed adjacent to the inner surface of the CRT housing. Sensors form to generate a reference magnetic field and to generate a sensor output signal in response to the detection of both the reference field and an external field as sensed within the housing. A bucking field coil drive circuit is provided in electrical communication with the field sensor, the drive circuit being operative to generate a bucking field coil drive signal responsive to the field sensor output signal. A bucking field coil is disposed circumferentially about the CRT and is driven by the bucking field coil drive signal. The bucking field coil generates a bucking electromagnetic field in opposition to the sensed external magnetic field, thereby opposing and reducing the degrading effects of the external magnetic field on the CRT display.

18 Claims, 8 Drawing Sheets

SIMPLIFIED BLOCK DIAGRAM

SENSORY GEOMETRY

SIMPLIFIED BLOCK DIAGRAM

CRT, SHIELD, SENSOR CROSS SECTION

FIG. 5a

MAGNETIC SHIELD/BUCKING COIL/
SENSOR GEOMETRY

FIG. 4   FUNCTIONAL BLOCK DIAGRAM

"E" CORE WINDING CONFIGURATION

SENSOR OUT vs HELMHOLZ FIELD

FIG. 8

BUCKING FIELD CURRENT VS EXT. FIELD
(4 SENSORS, CLOSED LOOP, AFTER DEGAUSS)

FIG. 9

SENSOR DRIVE ELECTRONICS

FIG. 10

SENSOR OUTPUT
SIGNAL PROCESSING

FIG. 11
POWER AMPLIFIER

CLOSED LOOP BUCKING FIELD SYSTEM

BACKGROUND OF THE INVENTION

The present invention relates to the operation of cathode ray tubes (CRT'S) and, more particularly, to mitigating the degrading effects of an external magnetic field upon the operation of a CRT. For purposes of this application the degrading effects discussed concern the convergence, purity and raster rotation of the CRT.

Existing CRT displays suffer intolerable display degradation in the presence of even moderate external magnetic fields. Magnetic shields, i.e. the high permeability housing, surrounding the CRT typically provides adequate shielding against external magnetic fields oriented orthogonal to the CRT viewing axis. However, they provide very little shielding against external fields oriented parallel to the CRT viewing axis. For monochrome displays, external magnetic fields aligned parallel to the CRT viewing axis rotate the raster about the center (zero deflection point) of the raster, causing the corners of the rasters to be obscured by the bezel and causing misregistration with the display and any bezel reference points (e.g. map overlays, variable function key switches with CRT displayed switch labels, etc.). Color shadow mask (CSM) displays are even more susceptible to external fields. In addition to raster rotation, CSM CRT displays lose color purity, convergence, and suffer increased brightness variation due to the external magnetic field induced beam landing errors.

It is known that the harmful effects of an external electromagnetic field may be reduced by providing a bucking field about the CRT. However, existing systems fail to adequately segregate the remedial bucking field from both the CRT display and the external field sensor. Attempts to measure the external field and regulate the bucking field have therefore been of limited success and have resulted in interfering with the normal operation of the display. In contemporary devices the remedial bucking field may operate to distort the CRT display, and/or may be detected and interpreted so as to be indistinguishable from the external field sought to be remedied. Contemporary systems are further limited in that the magnetic susceptibility of the CRT housing and sensor must be taken into account in order to accurately determine the strength and direction of the external field and generate an appropriate remedial field. Variations in the construction of the CRT and/or the sensor may substantially impact assessments of the strength of the external field and the appropriate bucking field.

The present invention provides an apparatus and technique wherein the external field to be remedied is detected at a location spaced from the bucking field to facilitate segregation and accurate assessment of the external field. Moreover, the measurement of the external field is effected within the CRT shielding housing so that the measured field is limited to that which is not adequately shielded by the housing. Consequently, the remedied bucking field will be limited to that necessary to mitigate the effects of the external magnetic field within the housing. The present invention therefore provides an apparatus and technique which overcome limitations of similar contemporary systems and readily accommodates variations in the sensor and CRT construction.

SUMMARY OF THE INVENTION

A system for improving the operation of a cathode ray tube (CRT) is disclosed whereby interference caused by external magnetic fields is mitigated. The system comprises a CRT having a CRT magnetic shield housing and at least one electromagnetic field sensor disposed adjacent to the inner surface of the CRT housing. Sensors form to generate a reference magnetic field and to generate a sensor output signal in response to the detection of both the reference field and an external field as sensed within the housing. A bucking field coil drive circuit is provided in electrical communication with the field sensor, the drive circuit being operative to generate a bucking field coil drive signal responsive to the field sensor output signal. A bucking field coil is disposed circumferentially about the CRT and is driven by the bucking field coil drive signal. The bucking field coil generates a bucking electromagnetic field in opposition to the sensed external magnetic field, thereby opposing and reducing the degrading effects of the external magnetic field on the CRT display.

In the presently preferred embodiment the field sensor comprises a plurality of "E" core sensors having opened ends disposed in abutting contact with the CRT shield inner surface. The sensor further comprises sensor drive coil disposed about the center leg of the "E" core and detector coils disposed about the outer legs of the "E" core. The detector coils are preferably disposed in series electrical connection. The sensor is preferably formed such that the sensor output signal is minimal in the absence of an external magnetic field. The bucking field coil drive circuit includes a potentiometer for setting a variable offset corresponding to the sensor output in the absence of an external magnetic field. The nulled sensor(s) output signal is attributed to an external field, and result in the generation of a bucking field to oppose the external field.

BRIEF DESCRIPTION OF THE DRAWINGS

FIG. 1c illustrates a signal induced in the detector coils of the sensors set forth in FIG. 1a;

FIG. 3 is a cross-sectional view of a CRT incorporating a pair of sensors such as that illustrated in FIG. 1a;

FIGS. 5a–c are top, side and front views, respectively, of the magnetic shield incorporating a bucking field coil in accordance with the present invention;

FIG. 6a illustrates the coil configuration of a sensor formed in accordance with FIG. 1a;

FIG. 6b is a schematic representation of the sensor coil configuration illustrated in FIG. 6a;

DETAILED DESCRIPTION OF THE PRESENTLY PREFERRED EMBODIMENT

The detailed description as set forth below is intended merely as a description of the presently preferred embodiment of the invention, and is not intended to represent the only form in which the present invention may be constructed or utilized. The description below sets forth the functions in sequence of signals that are affected by the invention in connection with the illustrated embodiment. It is to be understood, however, that the same, or equivalent functions or signal sequences may be accomplished by different embodiments that are also intended to be encompassed within the spirit and scope of the invention.

Figure 1A:
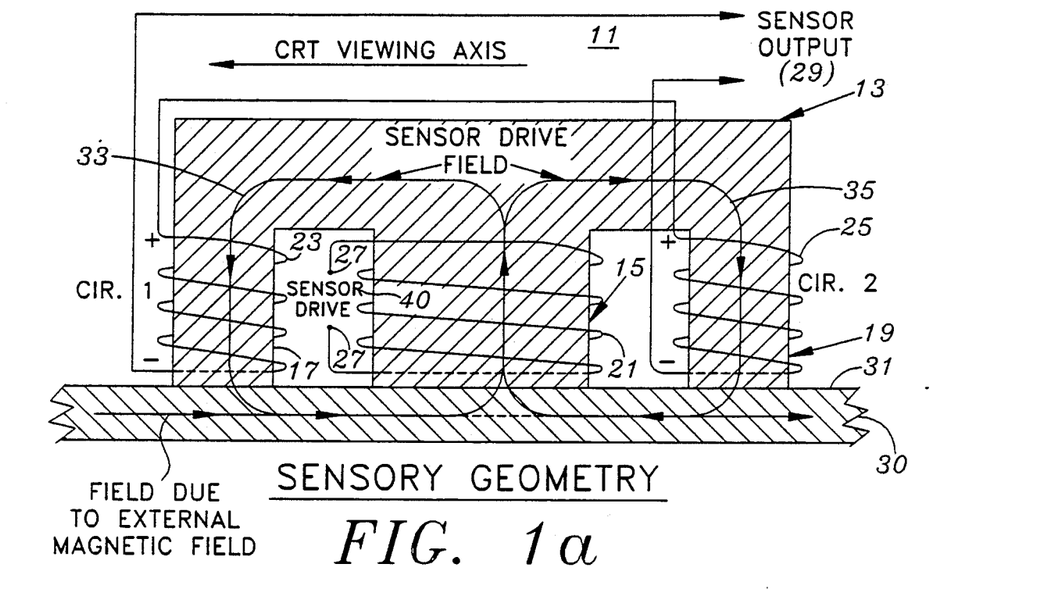
FIG. 1a illustrates the construction of an exemplary sensor formed in accordance with the present invention.
Figure 1B:
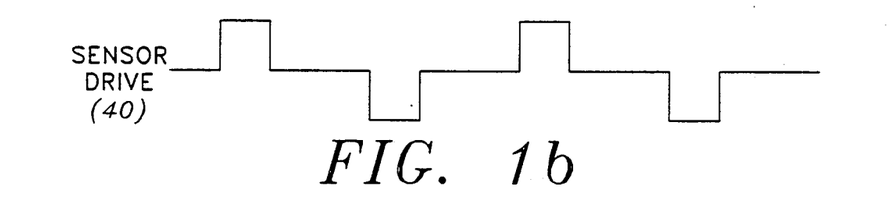
FIG. 1b illustrates the sensor drive signal applied to the drive coils of the sensor illustrated in FIG. 1.
Figure 1C:
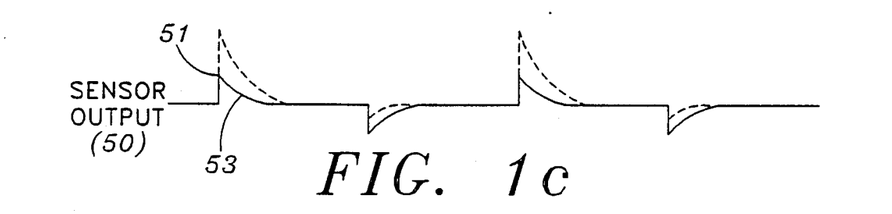

It is to be understood that the present invention comprises both a novel sensor design and system configuration which, though independently useful, cooperate in the present invention to achieve advantages over the operation of contemporary devices. FIG. 1 illustrates the construction of a sensor device in accordance with the present invention. As shown therein sensor 11 comprises a substantially "E" shaped core 13 provided with a center leg 15, and first and second peripheral legs 17, 19, respectively. Sensor drive coil 21 is formed about the core center leg 15. Sensor detector coils 23, 25 are disposed about peripheral legs 17, 19 respectively. An electrical sensor drive signal is provided to the sensor drive winding 21 via sensor drive port 27. The sensor detector coils 23, 25 are disposed in series electrical connection and generate an output at the sensor output port 29.

As further shown in FIG. 1 sensor 11 is disposed such that the open end of the sensor, i.e. defined by the lower face of sensor legs 15, 17 and 19, are disposed in abutting relationship with inner surface 31 of CRT shield 30. The CRT viewing axis is typically substantially parallel to the plane of surface 31.

In operation, a series of sensor drive signals of alternating polarity are applied to sensor drive input port 27. Representative sensor drive signals are illustrated in FIG. 1b. An electromagnetic field is generated as a result of the sensor drive pulse, with the field direction being dependent upon the polarity of the sensor drive pulse. FIG. 1a illustrates the field patterns generated as a result of a positive sensor drive pulse applied to sensor drive port 27. The application of a negative pulse to sensor drive port 27 will result in a field pattern of similar geometry, but opposite direction. As further illustrated in FIG. 1a, the sensor 11 operates to induce a field within the shield 30. As illustrated in FIG. 1, the sensor drive signal 40 generates an electromagnetic field. The electromagnetic field may be viewed as two magnetic circuits, Cir. 1 and Cir. 2, which are ideally balanced in the absence of an external field. The first circuit (C.) comprises the magnetic path between the sensor drive coil 21 and detector coil 23. The second circuit comprises the magnetic path between sensor drive coil 21 and detector coil 25. In theory, the sensor output signal 50 is substantially zero in the absence of an external magnetic field sensed within the CRT housing. That is, both magnetic circuits develop substantially identical field strength at the same rate, and the coils are connected such that the currents induced in the coils substantially cancel each other. In practice, however, the sensor output signal, even in the absence of an external field, is not zero due to factors such as unintentional air gaps between the core faces and the shield material and the non-perfect flatness of the materials. The sensor output signal 50 when no external magnetic field is present is shown in solid lines. Sensor output signal 50 is generally a spiked signal, having a peak amplitude 51 and followed by a decreasing amplitude portion 53. The positive and negative peaks are substantially the same amplitude.

In the presence of an external magnetic field the peak amplitude of the positive and negative portions of the sensor output signal will differ. The difference is due to the fact that the external magnetic field, and the field corresponding to the sensor drive signal, are additive during a first portion of the sensor drive signal (e.g. during the positive drive pulse) and subtractive during a second portion of the sensor drive signal (e.g. during the negative drive pulse). The present invention operates to detect changes in pulse amplitude attributable to the presence of the external magnetic field and to generate an output signal useful to create an appropriate bucking field.

The electromagnetic shield around the CRT represents a low reluctance shunt path for magnetic field lines oriented along the CRT axis. Where the sensor drive field is being aided by the external field (i.e. where both sensor drive field and the external magnetic field are additive) the sensed field is greater than the sensed field in the absence of any external field.

The sensor drive coil 21 is driven by an alternating polarity sensor drive pulse of sufficient volt-seconds to saturate the shield material that forms a portion of the magnetic path between the drive coil and the respective detector coils. As the shield material saturates, its permeability decreases, increasing the magnetic reluctance and decreasing the signal induced into the sensor detector coils 23, 25.

When no external magnetic field is present to the shield the signals induced into each of the sensor detector coils are normally equal, resulting in a net zero sensor output signal. In practice, the unintentional air gaps between the "E" core faces and the shield material, are not quite equal in both magnetic circuits, resulting in a small but non-zero sensor output with no external field. The small non-zero sensor output is depicted by the alternating polarity spiked pulses illustrated in FIG. 1b.

When an external magnetic field is aligned with the CRT viewing axis, (parallel to the long dimension of the "E" core), the external field will aid the driven sensor field in one of the magnetic circuits and oppose the other. The magnetic circuit that is aided by the external field will saturate more rapidly than the circuit that is opposed by the external field, resulting in more rapid decrease in amplitude of the pulse induced in the output winding of the magnetic circuit aided by the external field than the circuit opposed by the external magnetic field. Consequently, a net output signal is developed which represents both the non-zero output of the system with no external field in combination with the response of the sensor to the presence of the external field. As described below the processing circuitry in electrical communication with the sensor operates to distinguish the two components in the net output signal and thereby identify the output signal portion attributable to the effect of the external magnetic field. The processing circuitry then operates to generate a bucking field drive signal, regulated by the sensor output component attributable to the external field. The resulting bucking field functions to oppose the external field as it exists interior to the CRT. In the preferred embodiment the processing circuitry functions to integrate the sensor net output signal sychronously with the drive signal to develop the bucking field drive signal.

Figure 2:
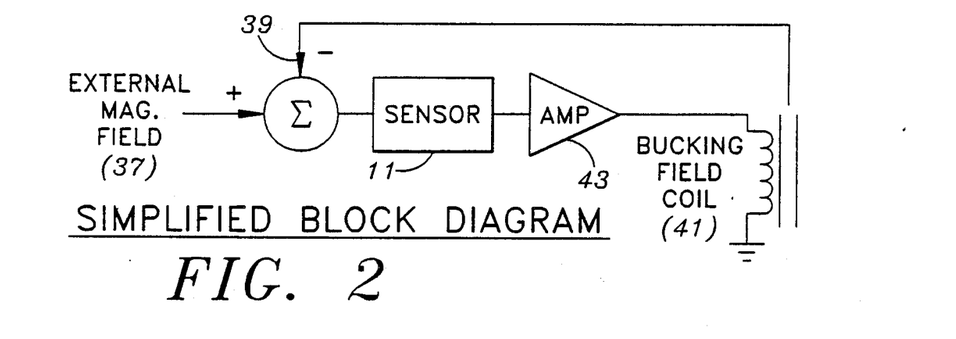
FIG. 2 is a simplified block diagram of a circuit formed in accordance with the present invention.

FIG. 2 illustrates a simplified block diagram of a bucking field system in accordance with the present invention. As shown therein the sensor net output, generally proportional to the field within the shield, is nulled by the servo loop. The external magnetic field 37 is summed with a bucking coil field 39 produced by the bucking field coil 41. The sensor 11, disposed within the shield 30, operates to determine whether or not any non-cancelled field results from the summing of the bucking coil field 39 and the external magnetic field 37. The sensor net output signal is communicated to amplifier 43 which scales the output of sensor 11 to an appropriate drive signal which is communicated to the bucking field coil 41. The circuit operates as a closed loop feedback system such that the bucking coil field 39 is regulated to mitigate the effect of the external magnetic field 37 within the CRT housing. The amplifier 43 includes adjustments to calibrate the system (i.e., to null any circuit and sensor offset errors) for operation of the system in the absence of an external magnetic field. Thus, the system thereby avoids generating any responsive bucking field in response to the low level sensor output attributable only to the characteristic operation of the system.

Figures 3, 5A:
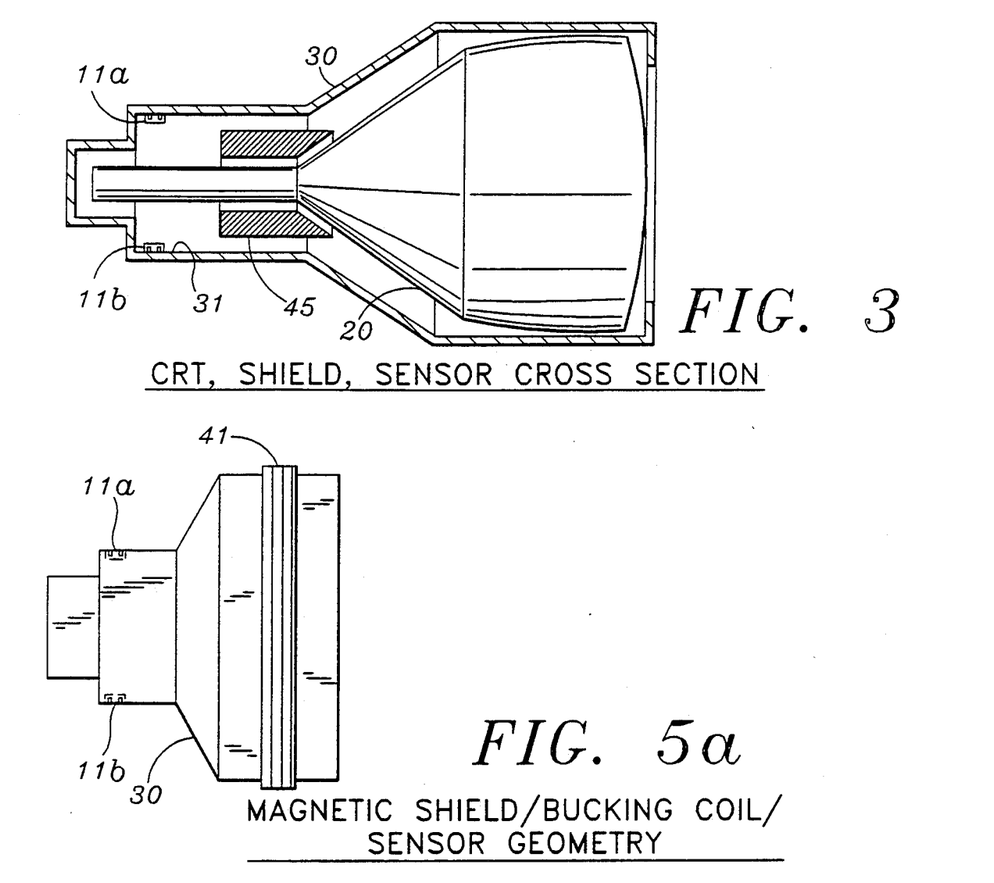

FIG. 3 illustrates a cross-sectional view of a CRT incorporating a plurality of sensors such as that illustrated in more detail in FIG. 1. As shown in FIG. 3 the sensors 11 are disposed adjacent the inner surface 31 of the CRT shield 30. Consistent with contemporary CRT'S, deflection yoke 45 operates to regulate the imaging of light signals on CRT 20. The "E" core sensors 11 are located inside the CRT shield 30 to decrease the sensitivity of the sensors to any transverse external magnetic fields. The CRT shield functions to both shield the sensors from external fields orthogonal to the CRT viewing axis. Thus, the construction substantially limits the generation of a remedial bucking field, in response to the presence of a transverse field. Consequently, the invention avoids the need to provide additional shielding about the sensors for transverse field components. The sensors are preferably located sufficiently rearward from the deflection yoke 45 to avoid inducing sensor noise into the deflection and/or deflection signals into the sensor circuit.

As further illustrated in FIG. 3, the invention encompasses the use of a plurality of sensors disposed at spaced locations along the inner surface 31 of CRT shield 30. The following circuit diagrams illustrate the use of four sensors symmetrically distributed radially about the CRT viewing axis. The output signals of the individual sensors may be averaged to form an error signal to drive the bucking field coil amplifier 43 (FIG. 2). Display performance is thereby extended to substantially greater levels of external fields. Moreover the use of a plurality of sensors mitigates the effect of magnetic field gradients occurring across the dimensions of the CRT shield. Tests have indicated that, in the absence of the present invention, external fields parallel to the CRT viewing axis can produce unacceptable levels of display degradation when the external field strength is approximately one oersted. With use of the present invention acceptable display performance can be extended to environments where the external field strength is approximately five oersteds.

Figure 4:
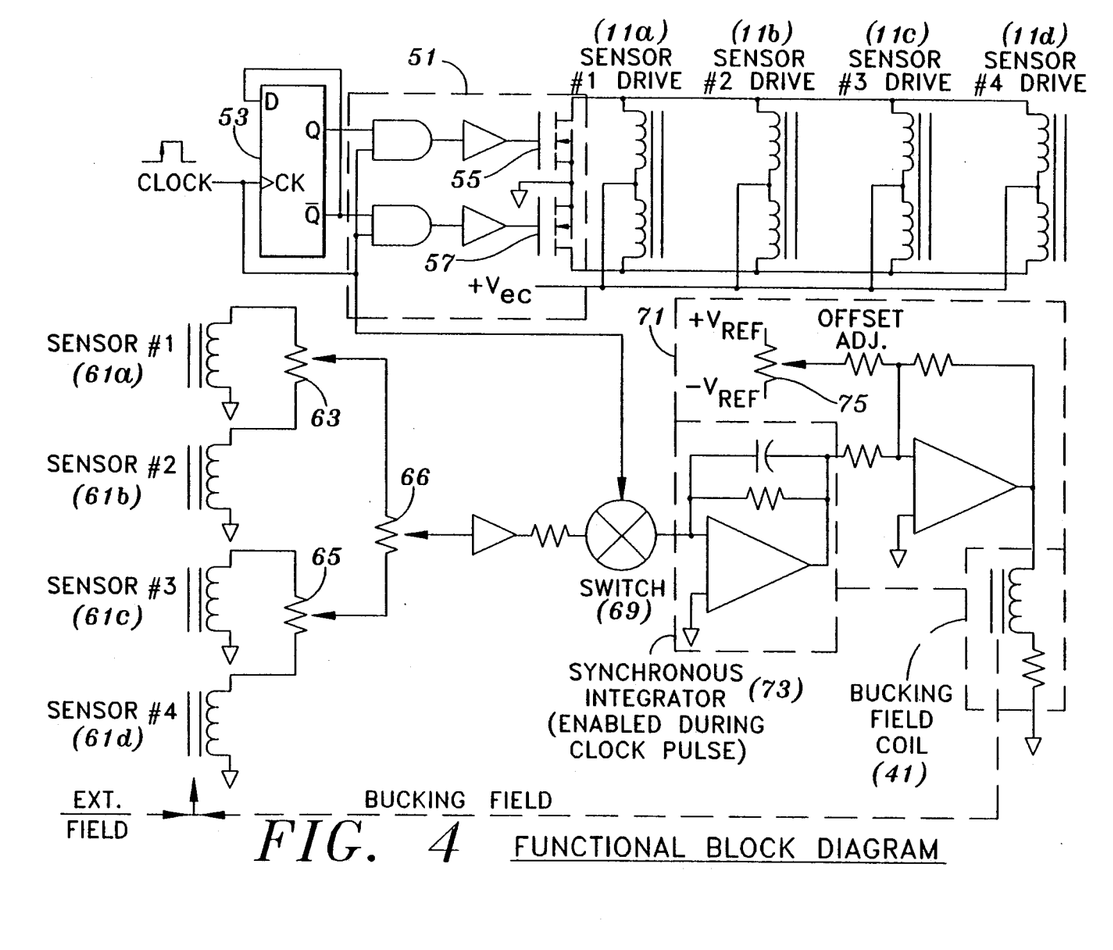
FIG. 4 is a functional block diagram formed in accordance with the present invention.

FIG. 4 illustrates a functional block diagram of a system formed in accordance with the present invention. As shown therein the circuit includes four sensors which are disposed about the CRT, as generally illustrated in FIG. 5c. Each of the sensors preferably comprise a center-tapped (bifilar) coil, which serves to simplify the generation of the dual polarity drive signals and the parallel connection of the sensors to a single drive source. Clock flip-flop 53 receives a clock input signal which operates to permit clock drive circuit 51 to alternately enable and disable transistors 55 and 57. This construction results in simultaneously communicating a sensor drive signal 40, of alternating polarity to each of the sensor drive coils 21a, 21b, 21c and 21d.

The detector coils of each sensor are represented as coils 61a, 61b, 61c and 61d. Potentiometers 63, 65 and 66 operate to gang the outputs of the sensor detector coils and balance the outputs to effectively null out any system imbalance in the absence of any external field, e.g. imbalances due to magnetic field gradients about the CRT viewing axis. Switch 69 operates to gate the ganged output from detector sensors 61a–d to the bucking field drive circuit 71 in coordination with the clock pulses. The output of switch 69 is communicated to sychronous integrator 73 which is enabled during the clock pulse. This sychronous integrator 73 reduces the effect of spikes on the bucking field coil drive circuit 71, limiting the response of the drive circuit 71 to the average value of a detected signal. Potentiometer 75 is useful to null out imbalances in the system as represented by the sensor output signal in the absence of any external field. When the sensor output exceeds a threshold amplitude level the bucking field coil drive circuit 71 operates to generate a bucking field coil drive signal which is communicated to bucking field coil 41. This causes bucking field coil 41 to generate an electromagnetic field about the CRT shield which opposes the detected external field. Sensor drive circuit 71 includes an amplifier circuit which appropriately scales the sensor drive signal in relation to the detected external field. The amplitude and other characteristics of the sensor drive signal may be scaled and modified in accordance with the particular environment of intended use.

Figure 5B:
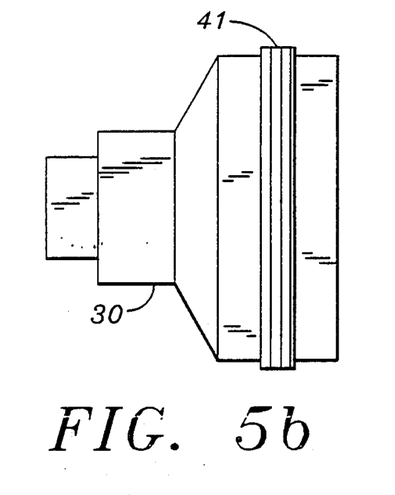
Figure 5C:
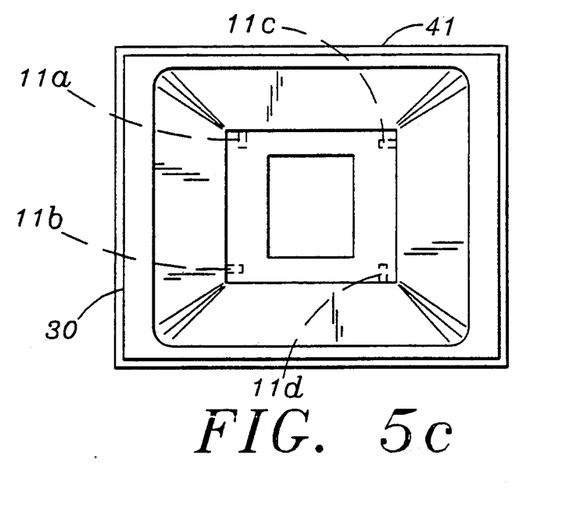

FIGS. 5a, 5b and 5c provide top, side and front views of the CRT incorporating features of the present invention. FIG. 5a illustrates sensors 11a and 11b disposed about an inner rearward surface of CRT 30. Bucking field coil 41 is shown disposed about CRT 30 at a location forward of the deflection yoke. FIGS. 5b and 5c provide further illustration of the positioning of the sensor elements 11a, 11b, 11c and 11d, as well as the bucking field coil 41.

Figure 6A:
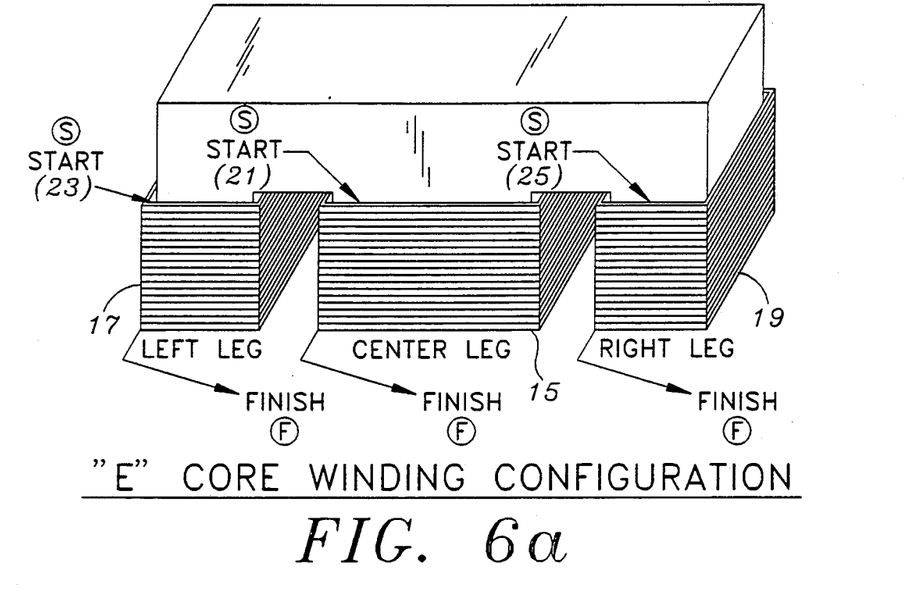
Figure 6B:
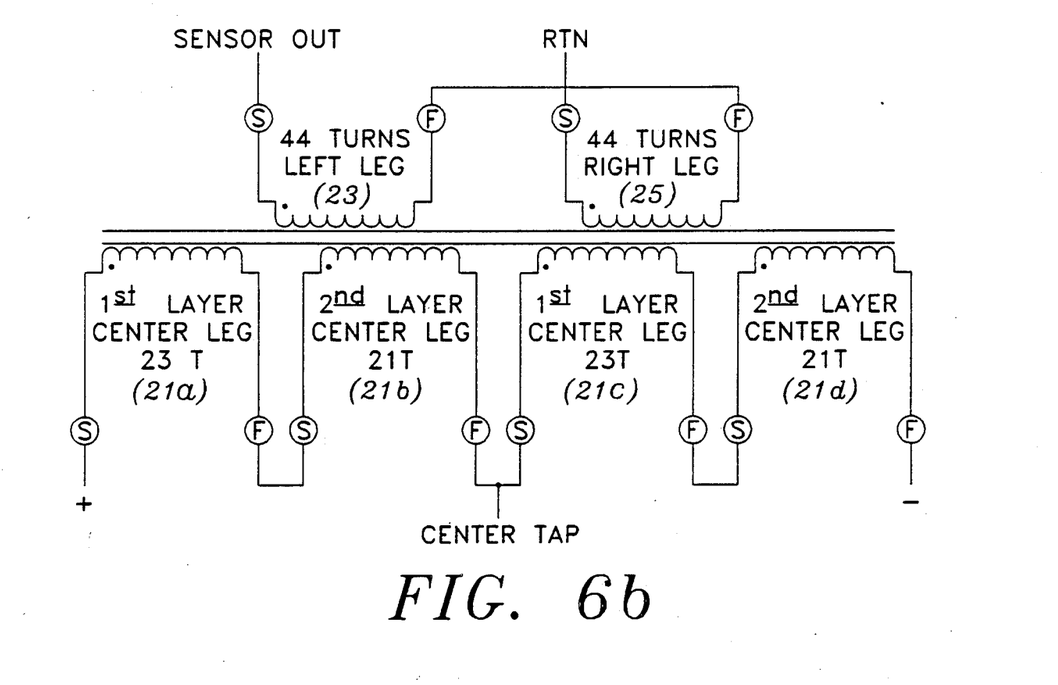
Figure 7:
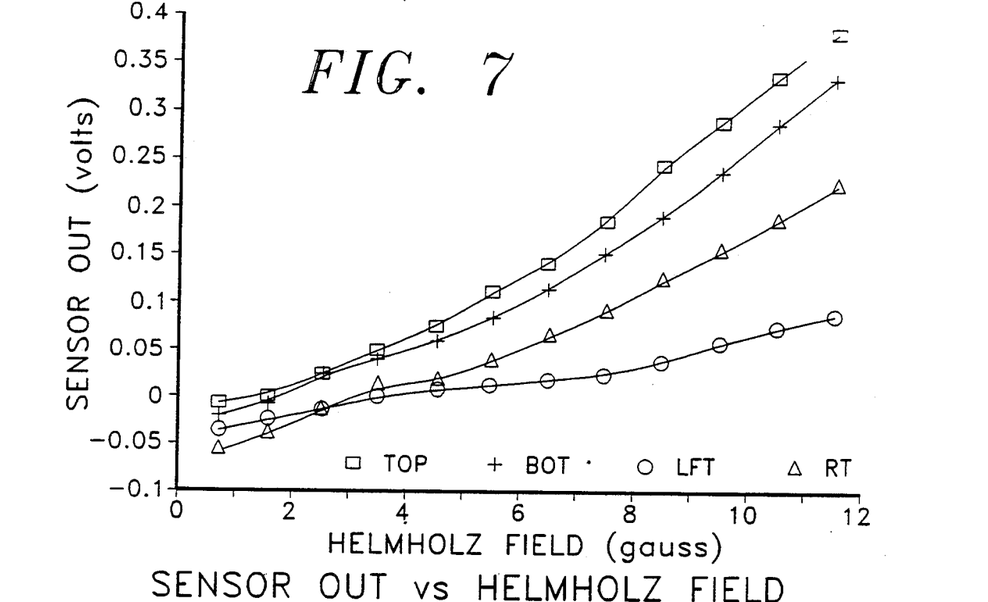
FIG. 7 is a grapical representation of the measured output of the sensors illustrated in FIG. 1a, when applied to the inner surface of a CRT, as a function of an external field.
Figure 8:
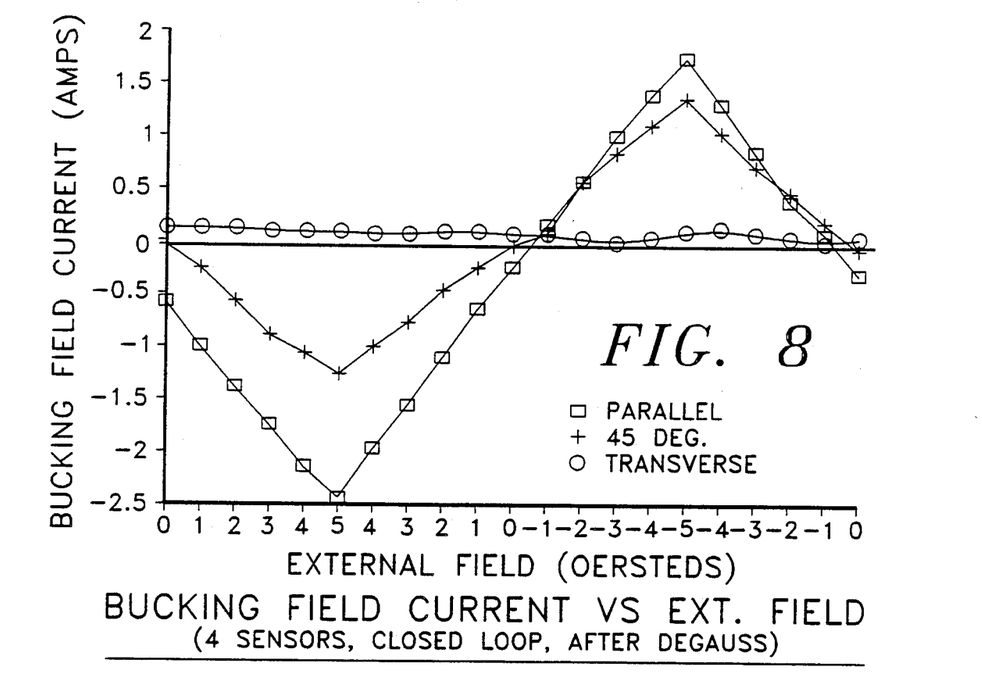
FIG. 8 is a graph of the measured bucking field coil current produced in accordance with the described embodiment, as a function of the external field. The three sets of data correspond to three orientations of the external field relative to the CRT viewing axis.

FIGS. 6a and 6b illustrate one exemplary technique for forming the "E" core sensor 11 and the appropriate winding procedure. FIG. 6a illustrates a pattern of forming the coils about the sensor legs. In the illustrated embodiment the coils 23, 21 and 25 each start at the upper portion of legs 17, 15 and 19, respectively. FIG. 6b provides a schemtic representation of the wiring pattern formed on the "E" core center.

The "E" core sensor has been formed using a core sold by Magnetics, Inc., part number 44020EC. A layer of one mil thick (0.001") mylar tape was formed about the legs of the "E" core to protect the coils from abrasion against the "E" core ferrite material. #30AWG magnetic wire (doubled) was used to form the coils. In the illustrated construction two layers of coils were formed on the center leg. The first layer was formed by 23 turns of the bifilar #30 wire. Thereafter the first layer was covered with a layer of mylar tape, leaving start and finish legs outside of the tape for later connection. A second layer of wiring was then formed about the center leg. Twenty-one turns of the bifilar wire were used to form the second layer. Upon completion of the second layer mylar tape was again wrapped around the wire. The left and right legs were each formed of 44 turns of wire, covered with one layer of mylar tape. The wirings were connected as illustrated in FIG. 6b.

Figure 9:
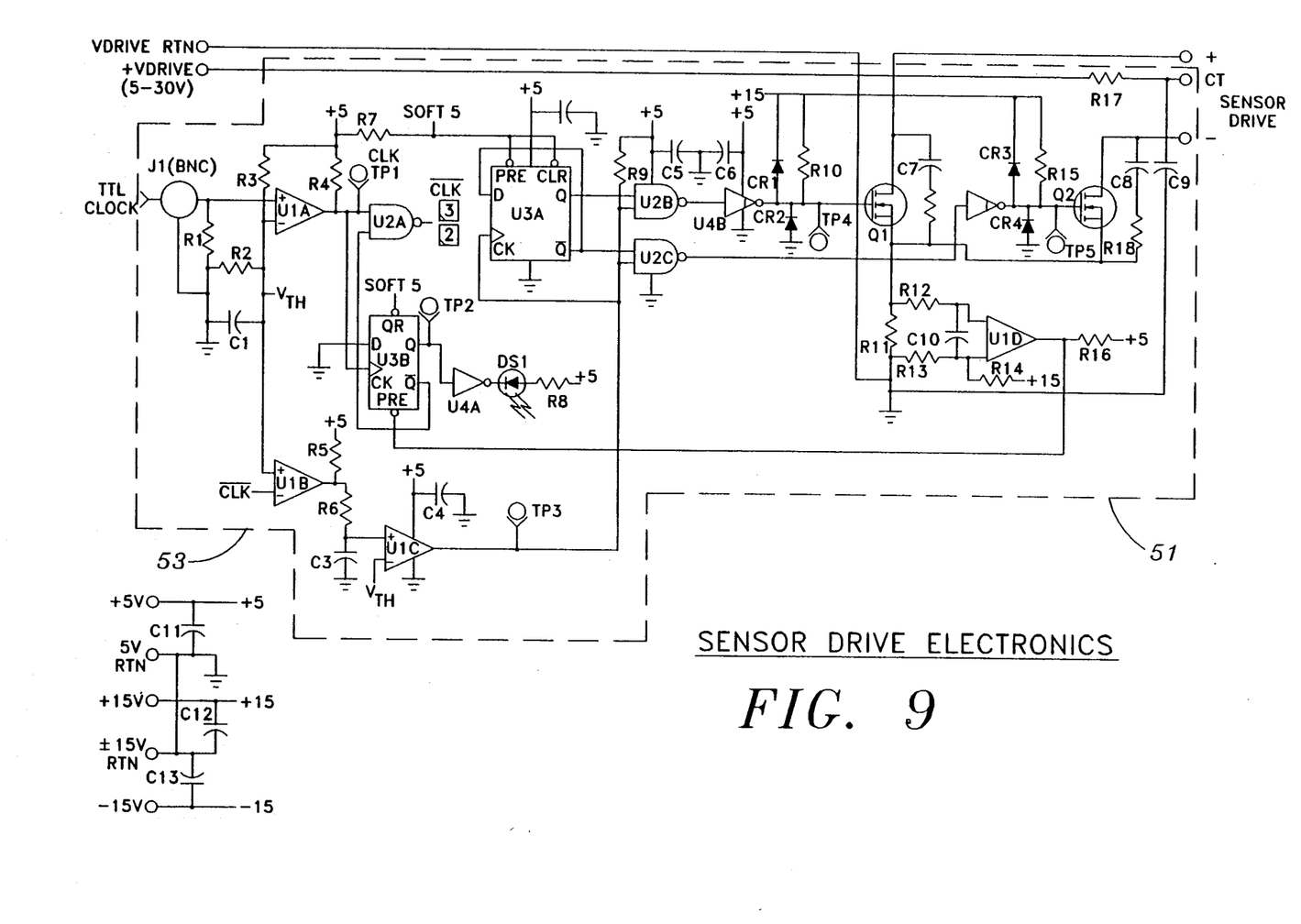
FIG. 9 is a schematic diagram of a sensor drive circuit formed in accordance with the present invention.

Pursuant to the construction illustrated in FIG. 6a and 6b, the magnetic parameters of the sensor were determined to be as follows:

core:
$A_e = 1.84$ sq. cm
$L_e = 4.82$ sq. cm
$B_{sat} = 4700$ G
$A_l(EI) = 8150$ mH/1000 sq. turns shield:
$A_e = (0.608 \times 0.62) \times (2.54 \text{ cm/in}) = 0.243$ sq.cm
$L_O = 0.05^2 \times 8150 = 20.4$ mH
$B_{sat} = 15$ kG FIG. 9 is a schematic representation of the sensor drive electronics, illustrating in more detail the circuitry set forth at FIG. 4. As previously described clock circuit 53 is operative to generate clock pulses which are useful to both drive the sensors and to enable the synchronize integrator. Sensor drive circuit 51 receives the clock pulses and generates sensor drive signals. In the presently preferred embodiment the sensors are implemented as center tapped transformers alternating the polarity of the pulse drive signals.

Figure 10:
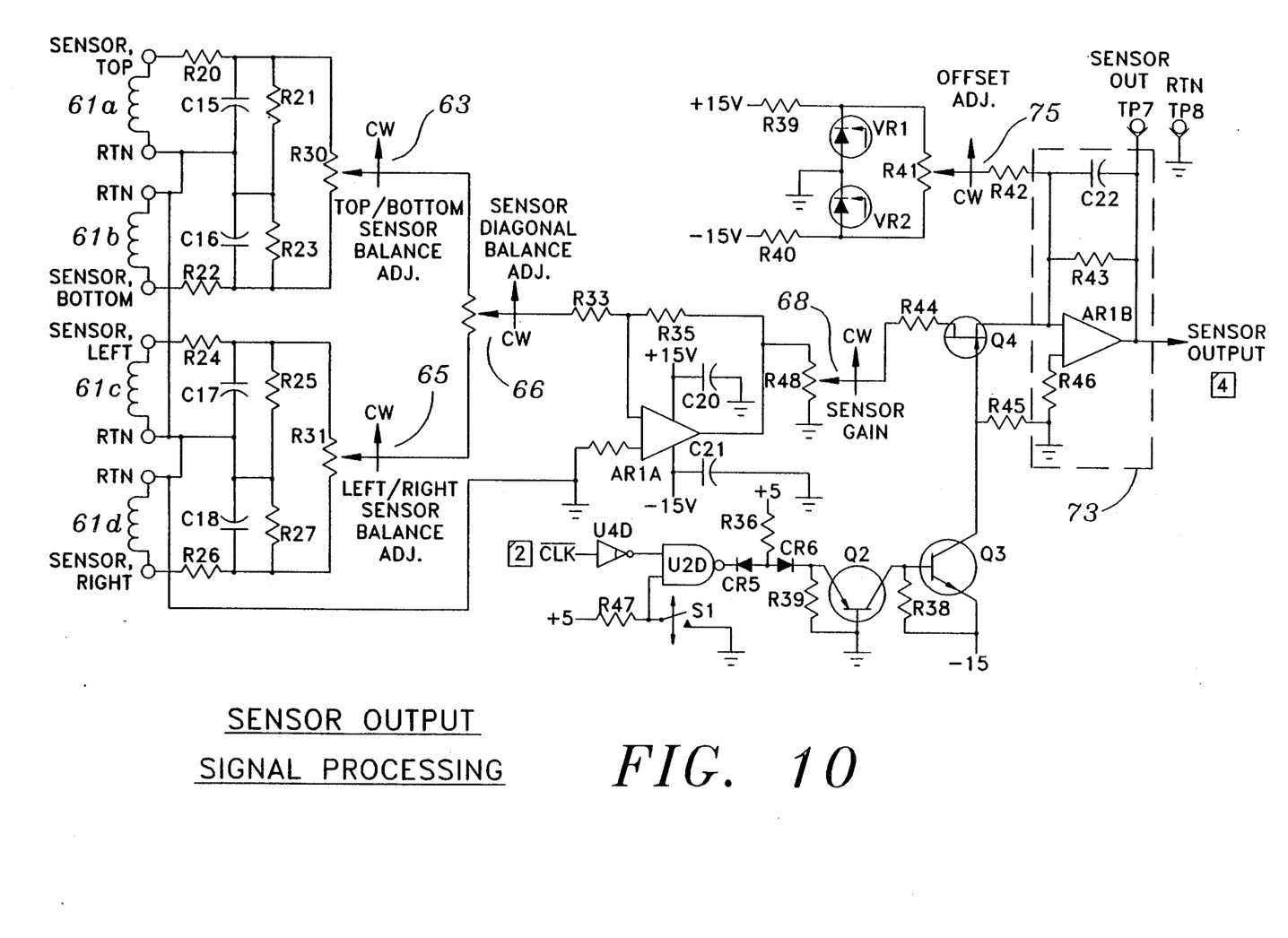
FIGS. 10 and 11 are schematic diagrams of a sensor output signal processing circuit formed in accordance with the present invention.

FIG. 10 is a schematic representation of the sensor output signal processing circuit, shown more generally in FIG. 4. Sensor output from the sensor coils 61a, 61b, 61c and 61d are communicated through an RC filter network to potentiometers 63, 65, which serve as balance adjusts for the top/bottom and left/right sensors, respectively. Potentiometer 66 serves as a sensor diagonal balance adjust. The balanced sensor output signal is then communicated to transistor Q4, which is gated by the clock CLK signal input to Q4. Sensor gain is regulated by potentiometer 68. The gated sensor output signal is communicated to the synchronous integrator 73 which smooths the operation of the system to avoid undesirable responses to spurious signals. Potentiometer 75 serves as an offset adjust to null out any error in the system due to system non-zero response in the absence of an external field. Thus, the present invention may be adapted for use in conjunction with a variety of different CRT's. The output from the synchronous integrator 73 represents the drive to the bucking field coil (not shown) which generates the opposing magnetic field to mitigate the effects of the interfering field.

Figure 11:
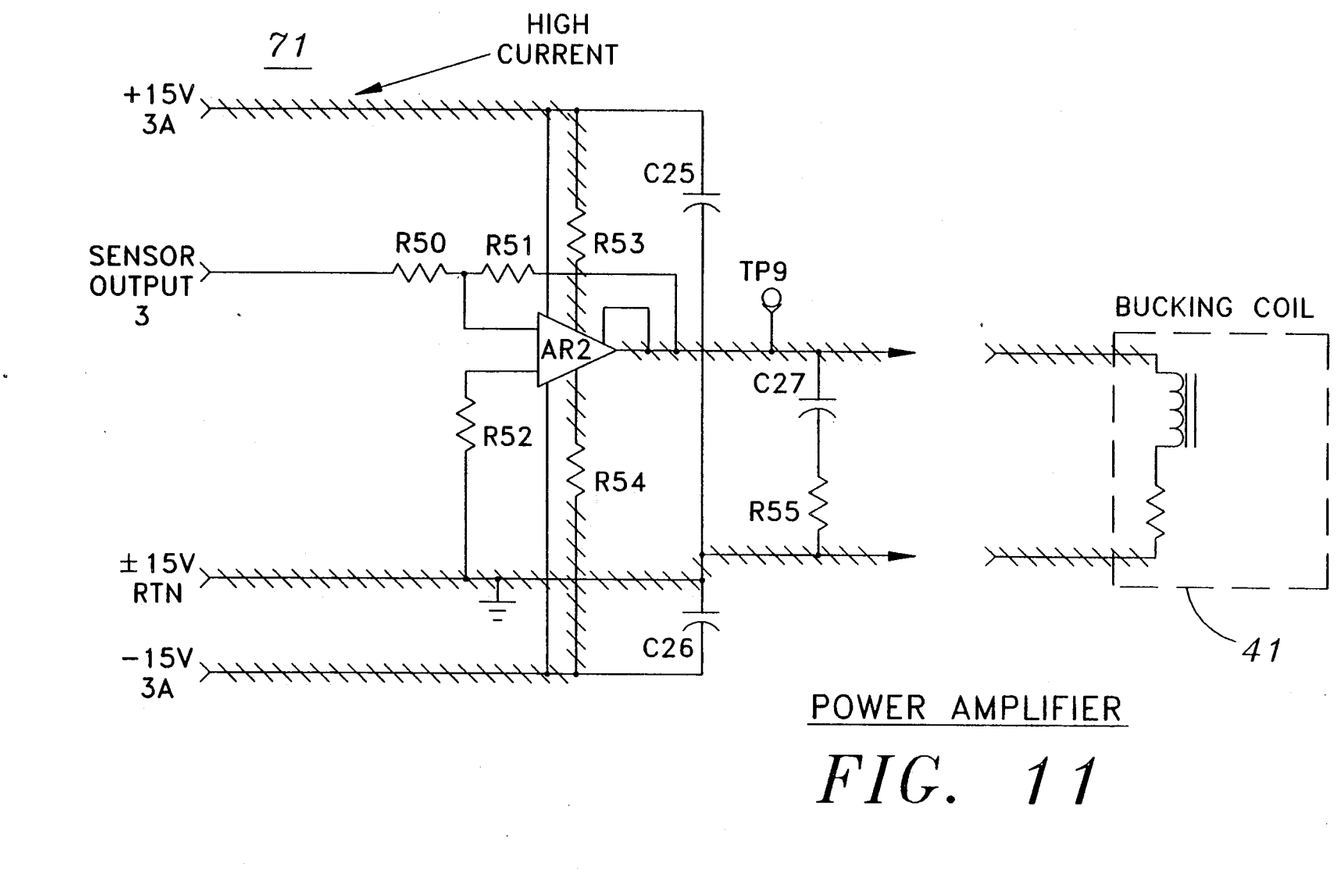

The output from the synchronous integrator may in turn be amplified, as represented in FIG. 11. The amplification circuit shown therein, representing a portion of amplifier circuit 71 (shown more generally in FIG. 4) utilizes the output from the synchronous integrator to regulate a high current drive signal used to drive the bucking field coil 41. The strength of the bucking field coil current may be selected in accordance with a particular application. Moreover, the relationship between the sensor output and the strength of the bucking field, linear or non-linear, may also be dictated by the requirements of a particular application. For example, it is anticipated that the CRT shield may exhibit hysteresis characteristics that may require evaluation prior to determination of the optimum bucking field generated in response to different levels of external field. Moreover, the frequency of the external field may also impact the determination of the appropriate remedial field. The presently preferred embodiment is directed to a closed loop bucking field system suitable to remedy the affects of a substantially constant externally magnetic field. However, it is anticipated that other embodiments may be usable to remedy alternating external magnetic fields.

What is claimed is:

1. A system for improving the operation of a cathode ray tube (CRT) by reducing interference caused by external electromagnetic fields comprising:
a CRT having a CRT magnetic shield housing
at least one electromagnetic field sensor disposed adjacent to an inner surface of the CRT magnetic shield, said sensor being formed to generate a reference electromagnetic field and to generate a sensor output signal in response to detection of both the reference field and an external field as sensed within the shield;
a bucking field coil drive circuit in electrical communication with said field sensor, the bucking field drive circuit being operative to generate a bucking field drive signal responsive to said field sensor output signal; and
a bucking field coil disposed circumferentially about said CRT and driven by said bucking field coil drive signal to generate a bucking electromagnetic field in opposition to the sensed external magnetic field, to oppose and reduce the degrading effects of the sensed external magnetic field on the operation of the CRT.

2. The system as recited in claim 1 further comprising a plurality of said sensors disposed about the CRT inner surface.

3. The system as recited in claim 1 wherein said sensor comprises an "E" core, said "E" core having an open end disposed in abutting contact with the CRT shield inner surface.

4. The system as recited in claim 3 wherein said sensor further comprises a sensor drive coil disposed about a center leg of the "E" core and first and second detector coils disposed about first and second outer legs of the "E" core, respectively.

5. The system as recited in claim 4 wherein said first and second detector coils are disposed in electrical series connection and both wound in the same direction.

6. The system as recited in claim 5 further comprising a sensor drive signal circuit operative to generate a sensor drive signal having signal portions of alternating polarity signal portions.

7. The sytem as recited in claim 1 wherein said sensor output signal, in the absence of a sensed external field, comprises a first spiked signal of alternating polarity.

8. The system as recited in claim 7 wherein, in the presence of a sensed external field, said sensor output signal comprises a second spiked signal of alternating polarity, the amplitude of said spiked signal varying in response to the strength of the sensed external magnetic field.

9. The system as recited in claim 8 wherein the external magnetic field is additive with respect to the amplitude of a spiked signal portion having a first polarity and subtractive with respect to the amplitude of spiked signal portions having a second polarity.

10. The system as recited in claim 8 wherein the amplitude of the alternating polarity spiked signal corresponds to detection of the reference field.

11. The system as recited in claim 1 wherein the bucking field drive circuit is operative to segregate a first portion of the sensor output signal attributable to detection of the external field and to regulate the amplitude of said bucking field drive signal in response to said sensor output signal first portion.

12. The system as recited in claim 1 further comprising a plurality of field sensors exposed at spaced locations adjacent the inner surface of the CRT magnetic shield housing.

13. Sensor apparatus for sensing an electromagnetic field within a ferromagnetic body comprising:

an "E" core sensor body having an open end disposed in abutting contact with the ferromagnetic body, the "E" core having a center leg and first and second outer legs;

a sensor drive coil disposed about the "E" core center leg; and first and second detector coils disposed about the "E" core first and second outer legs, respectively, said first and second detector coils being disposed in electrical series connection;

said sensor drive coil being operative to receive a sensor drive signal and generate a reference field in response thereto;

said first and second detector coils being operative to generate a minimum output signal in response to a generation of said reference field, when no external field is present and to generate a sensor output signal in response to the generation of said reference field when an external field is present, said sensor output signal being useful to generate a bucking electromagnetic field in response to the external magnetic field.

14. The sensor as recited in claim 13 wherein said first and second detector coils are wound in the same direction.

15. The system as recited in claim 14 wherein said sensor drive signal comprises an alternating polarity signal, the amplitude of said alternating polarity signal being sufficient to a magnetic path within the ferromagnetic body adjacent the sensor body.

16. The system as recited in claim 15 wherein said sensor output signal, when no external field is present, comprises a first spiked signal of alternating polarity.

17. The sensor as recited in claim 16 wherein said sensor output signal, in the presence of an external field, comprises a second spiked signal of alternating polarity, the amplitude of said spiked signal varying in response to the strength of the sensed external magnetic field.

18. The sensor as recited in claim 17 wherein the second spiked signal comprises a first polarity portion and a second polarity portion, said external field being additive with respect to only one of said first and second polarity portions.

* * * * *